July 5, 1955

F. C. BELCHER 2,712,195

FISHING LURES

Filed July 2, 1951

FOY C. BELCHER
INVENTOR.

BY
James L. Livnau
ATT'Y

United States Patent Office 2,712,195
Patented July 5, 1955

2,712,195

FISHING LURES

Foy C. Belcher, Portland, Oreg.

Application July 2, 1951, Serial No. 234,849

1 Claim. (Cl. 43—42.5)

This invention relates to improvements in fishing lures, and more particularly to the type known as a "spoon" or "wobbler."

It is one of the principal objects of the invention to provide a lure of this character preferably made of sheet metal within precision limits and so formed as to simulate, as it is drawn through the water at various speeds, the motions of a crippled fish.

Another object is the provision of an enlarged concave or curved portion at the trailing end of the lure which is of greater width than the body of the lure whereby the lure is forced from side to side more rapidly in a swinging motion and to a much greater extent than that obtainable by spoons now common in the art which taper toward either end or which taper from the forward end to the trailing end.

A further object resides in the formation of the oppositely curved or convex forward end of the lure which is accomplished by the formation of nodules in the body of the spoon and arranged in a semi-circle or any other desired pattern. These nodules also contribute to the attractiveness of the lure.

The foregoing and other objects will appear as my invention is more fully hereinafter described in the following specification illustrated in the accompanying drawing and finally pointed out in the appended claim.

Figure 1:
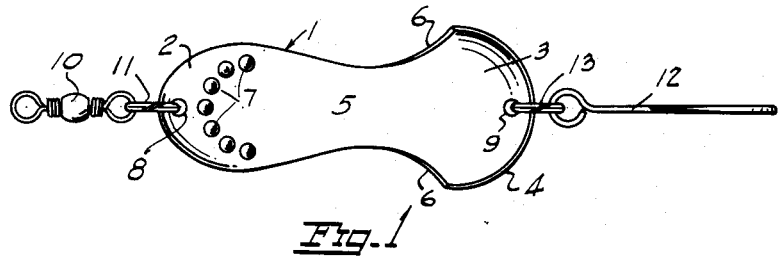
Figure 1 is a top plan view of a fishing lure made in accordance with my invention.
Figure 2:
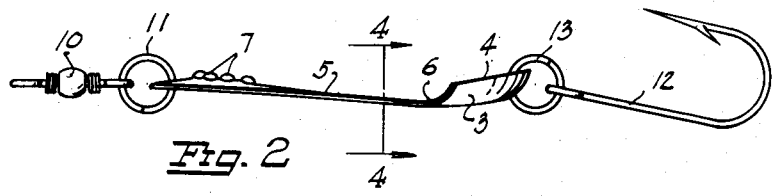
Figure 2 is a side elevation of Figure 1.
Figure 3:
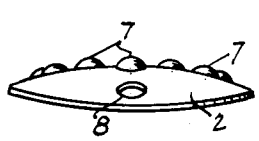
Figure 3 is an enlarged elevation of the forward end of the lure with the swivel and split ring removed.
Figure 4:
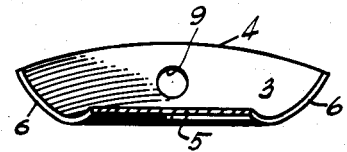
Figure 4 is an enlarged sectional end view taken along the line 4—4 of Figure 2 with the fish hook and split ring removed.

Referring now more particularly to the drawing:

The body of the lure, generally indicated by reference numeral 1, is preferably made of sheet metal such as brass, copper, bronze, aluminum and the like and is formed with a convex forward portion 2 and a concave trailing portion 3 which terminates in a semi-circular rim 4. The intermediate portion 5 of the body of the lure is flat for the major portion of its length and tapers rearwardly, as shown, then flares outwardly and upwardly as at 6 as it merges into the forward edges of the semi-circular concave portion 3. It is to be noted that one of the important features of the invention resides in the formation of said concave portion which is of greater width than the remaining portion of the body of the lure and also in the curved formation of the forward edges of said concave portion and the mergence thereof with the narrowest lateral dimension of the body of the lure.

The forward convex portion of the body of the lure is formed by the use of a center-punch or other similar tool having a blunt or rounded end driven against the forward portion of the lure at intervals arranged in a semi-circle or any other desired pattern while the forward portion of the lure is resting upon any approved type of forming die such for instance as a block of hardwood, soft metal such as lead, babbitt, or the like and having a concavity therein conforming to the desired shape into which the forward end of the lure is to be put into final form. The use of a blunt or rounded end tool produces a series of nodules 7 arranged in any desired pattern as aforesaid. The nodules, of course, are polished along with the polishing of the lure and contribute to its attractiveness to a fish. The forward and trailing ends of the body of the lure are provided with apertures 8 and 9, respectively, for attachment of a swivel 10 by means of a split ring 11, or the like, to the forward end of the lure and for attachment of a fish hook 12, by means of a split ring 13, to the trailing end.

The more rapid swinging motion of the trailing end of the lure and its greater operative range than any fishing lures I am aware of is caused by the concave formation of the trailing end of the lure which is of greater width than the remaining portion of the body of the lure which tapers rearwardly and merges at its narrowest width with the forward edges of said concave portion. This arrangement provides deflectors extending outwardly from both sides of the flat and reduced portion of the body of the lure. The deflectors cut into the water to a much greater extent as the lure is being drawn forwardly through the water than is possible with conventional types of spoons or wobblers of substantially uniform width throughout their length and whose trailing ends are merely turned upwardly or downwardly.

While I have shown a particular form of embodiment of my invention I am aware that many minor changes therein will readily suggest themselves to others skilled in the art without departing from the spirit and scope of the invention. Having thus described my invention, what I claim as new and desire to protect by Letters Patent is:

A fishing lure comprising an elongated body member of sheet material having a downwardly convexed forward end portion provided with a rounded leading edge and curved side edges converging rearwardly into an intermediate portion, said intermediate portion being substantially flat adjacent said convex forward end and having an outwardly and upwardly flared portion leading from said flat portion and merging into a concavo-convex rear portion, the rounded leading edge and the edge of the flat part of the intermediate portion being in a single plane, said rear portion terminating in an upwardly facing semi-circular rim formed on a greater radius than said rounded leading edge and providing a deflecting surface, there being a single row of spaced apart nodules arranged in a semi-circle on the top surface of said forward end, and means on said forward end for attaching a fishing line, said deflecting surface being adapted to impart a swinging motion to said body member when the same is drawn through the water.

References Cited in the file of this patent

UNITED STATES PATENTS

| Number | Name | Date |
|---|---|---|
| 341,954 | Skinner | May 18, 1886 |
| 1,115,743 | Selig | Nov. 3, 1914 |
| 1,179,964 | Robertson | Apr. 18, 1916 |
| 1,471,280 | Reekers | Oct. 16, 1923 |
| 1,624,116 | Putnam et al. | Apr. 12, 1927 |
| 1,861,110 | Campbell | May 31, 1932 |
| 2,192,563 | Starkey | Mar. 5, 1940 |
| 2,238,292 | Schavey | Apr. 15, 1941 |